US010815833B1

(12) United States Patent
McIntyre, II et al.

(10) Patent No.: US 10,815,833 B1
(45) Date of Patent: Oct. 27, 2020

(54) EXHAUST BAFFLE APPARATUS AND METHOD

(71) Applicant: Marine Turbine Technologies, LLC, Franklin, LA (US)

(72) Inventors: Ted Lee McIntyre, II, New Iberia, LA (US); Nelson Joseph Geoffroy, Erath, LA (US); Sylvester Lopez, Jeanerette, LA (US)

(73) Assignee: Marine Turbine Technologies, LLC, Franklin, LA (US)

( * ) Notice: Subject to any disclaimer, the term of this patent is extended or adjusted under 35 U.S.C. 154(b) by 0 days.

(21) Appl. No.: 16/418,200

(22) Filed: May 21, 2019

(51) Int. Cl.
*F01D 25/30* (2006.01)
*F01D 25/12* (2006.01)
*F02C 7/24* (2006.01)

(52) U.S. Cl.
CPC ............ *F01D 25/30* (2013.01); *F01D 25/12* (2013.01); *F02C 7/24* (2013.01); *F05D 2260/201* (2013.01); *F05D 2260/2214* (2013.01); *F05D 2260/96* (2013.01)

(58) Field of Classification Search
CPC .... F01D 25/30; F01D 25/12; F05D 2260/201; F05D 2260/2214; F05D 2260/96; F02C 7/24

See application file for complete search history.

(56) References Cited

U.S. PATENT DOCUMENTS

| | | | |
|---|---|---|---|
| 2,944,623 A | 7/1960 | Bodine, Jr. | |
| 4,066,214 A | 1/1978 | Johnson | |
| 4,753,319 A * | 6/1988 | Vinciguerra | F01D 25/30 181/218 |
| 4,953,660 A * | 9/1990 | Jewell, Jr. | F01N 1/02 181/266 |
| 5,496,975 A * | 3/1996 | Wagner | F01N 1/08 181/269 |
| 6,139,259 A | 10/2000 | Ho et al. | |
| 6,257,367 B1 * | 7/2001 | Allman | F01N 1/084 181/272 |
| 6,364,054 B1 * | 4/2002 | Bubulka | F01N 1/003 181/264 |
| 6,502,383 B1 | 1/2003 | Janardan et al. | |
| 6,679,351 B2 | 1/2004 | Cummings et al. | |
| 6,942,061 B2 * | 9/2005 | Butterfield | F01N 1/083 181/268 |

(Continued)

OTHER PUBLICATIONS

Norris, T., "Noise Reduction in Engine Exhaust", The Journal of the Acoustical Society of America 73, p. 398 (1983), https://asa.scitation.org/doi/10.1121/1.388743, (2 pp).

*Primary Examiner* — Shafiq Mian
(74) *Attorney, Agent, or Firm* — Young Basile Hanlon & MacFarlane, P.C.

(57) ABSTRACT

An exhaust baffle apparatus includes an enclosure having longitudinal, lateral, and anterior dimensions. The apparatus defines an internal volume defining an airflow path proceeding from an intake opening to an exhaust opening. There are a multiplicity of mixers within the enclosure. Each mixer includes a length spanning the lateral dimension of the enclosure. Each mixer further comprises a hollow airfoil substantially open at lateral ends of the mixer and at least one vent oriented toward the exhaust opening. A different feature involves a method of dampening noise and heat form engine exhaust.

27 Claims, 11 Drawing Sheets

(56) References Cited

U.S. PATENT DOCUMENTS

| | | |
|---|---|---|
| 7,389,852 B2 * | 6/2008 | Voss ........................ F01N 1/003 |
| | | 165/135 |
| 7,607,287 B2 | 10/2009 | Reba et al. |
| 7,717,229 B2 | 5/2010 | Putnam |
| 8,544,278 B2 | 10/2013 | Sylla et al. |
| 8,746,401 B2 * | 6/2014 | Butler ..................... F01N 1/083 |
| | | 181/268 |
| 8,800,261 B2 | 8/2014 | Hall et al. |
| 2010/0077754 A1 * | 4/2010 | Jangili .................... F24F 13/24 |
| | | 60/725 |
| 2016/0298651 A1 | 10/2016 | Topol |
| 2016/0312746 A1 * | 10/2016 | Benajes Calvo ...... F02M 26/70 |

* cited by examiner

EXHAUST BAFFLE APPARATUS AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The field of endeavor concerns devices for reducing heat and sound produced by mostly stationary industrial engines such as gas turbine turboshaft engines at a hydrocarbon production well site.

2. Description of the Related Art

In hydraulic fracturing operations, internal combustion engines are harnessed to drive pumps that develop immense downhole pressure. The downhole pressure is sufficient to fracture rock formations and thereby release otherwise unavailable hydrocarbon reserves. The engines recruited in these endeavors can produce a significant amount of noise and heat, much of this by way of engine exhaust. Although hydraulic fracturing sites are typically located away from residential and commercial development, exhaust noise and heat can still be a problem for personnel that work at these sites.

The problem is compounded when gas turbine engines are used since these engines are more powerful and also produce greater exhaust noise and heat. Indeed, with gas turbine engines, nearly everything is amplified: torque, horsepower, and fuel consumption, exhaust noise, and heat. The situation is further amplified because the engine installations often include nearby control interfaces and hardware, well within the noise and heat profile of the engine installations. Crew frequently have no alternative but to work near the engines and their noise and heat.

There are various conventional approaches to addressing gas turbine engine exhaust noise at a well site. For one, there is the approach of requiring crew to use hearing protection. That can help, but it is still desirable to find every conceivable avenue to absolutely minimize exhaust noise because this helps reduce job site fatigue and injury. And, although hearing protection helps to confront the noise issue, it does nothing to confront exhaust heat.

Another approach is to minimize exhaust noise and heat by moving the engines far away, but this is often impractical. Typically is it is most efficient and often essential to locate the engines and pumping equipment near the well head. This helps that the equipment achieve peak efficiency and also avoids sacrificing power that would otherwise be lost due to the need to transfer fluids or mechanical engine output over a long distance.

Another strategy includes modifying the gas turbine engine itself. Gas turbine engines are basically air pumps, and various contrivances have been developed for mixing exhaust flow with air from other stages in the engine. Most work in this area focuses on reducing noise in turbofan engines for airplanes, which are fundamentally different than the turboshaft gas turbine engines required for hydraulic fracturing. Furthermore, the approach of modifying an engine to reduce noise is extremely impractical for companies that supply or operate well sites, as the ability to pioneer this technology lies exclusively within the realm of sophisticated engine manufacturers such as Pratt & Whitney, Lycoming, General Electric, etc.

Although some may be happy with the state of the art, the present inventors have uniquely recognized that further improvements may be possible. In this regard, a particular problem confronting the present inventors is the need to develop a system for reducing both engine noise and heat from gas turbine engines in industrial settings such as hydrocarbon production well sites.

SUMMARY OF THE INVENTION

One aspect of the present disclosure is an exhaust baffle apparatus that includes an enclosure having longitudinal, lateral, and anterior dimensions. The apparatus defines an internal volume defining an airflow path proceeding from an intake opening to an exhaust opening. There are a multiplicity of mixers within the enclosure. Each mixer includes a length spanning the lateral dimension of the enclosure. Each mixer further comprises a hollow airfoil substantially open at lateral ends of the mixer and at least one vent oriented toward the exhaust opening.

Another aspect of the present disclosure is a method of dampening noise and heat from engine exhaust. This method directs engine exhaust into an intake opening of an enclosure defining an internal volume with having opposing openings including the intake opening and an exhaust opening. Thereafter, engine exhaust is directed along an exhaust path proceeding from the intake opening to the exhaust opening. The directed exhaust is passed across a multiplicity of mixers within the enclosure. Each mixer includes a length spanning the enclosure transverse to the exhaust path. Each mixer comprises a hollow airfoil substantially open at lateral ends of the mixer and at least one vent oriented toward the exhaust opening.

TABLE 1

INDEX OF NUMERIC REFERENCES

Figure 1:
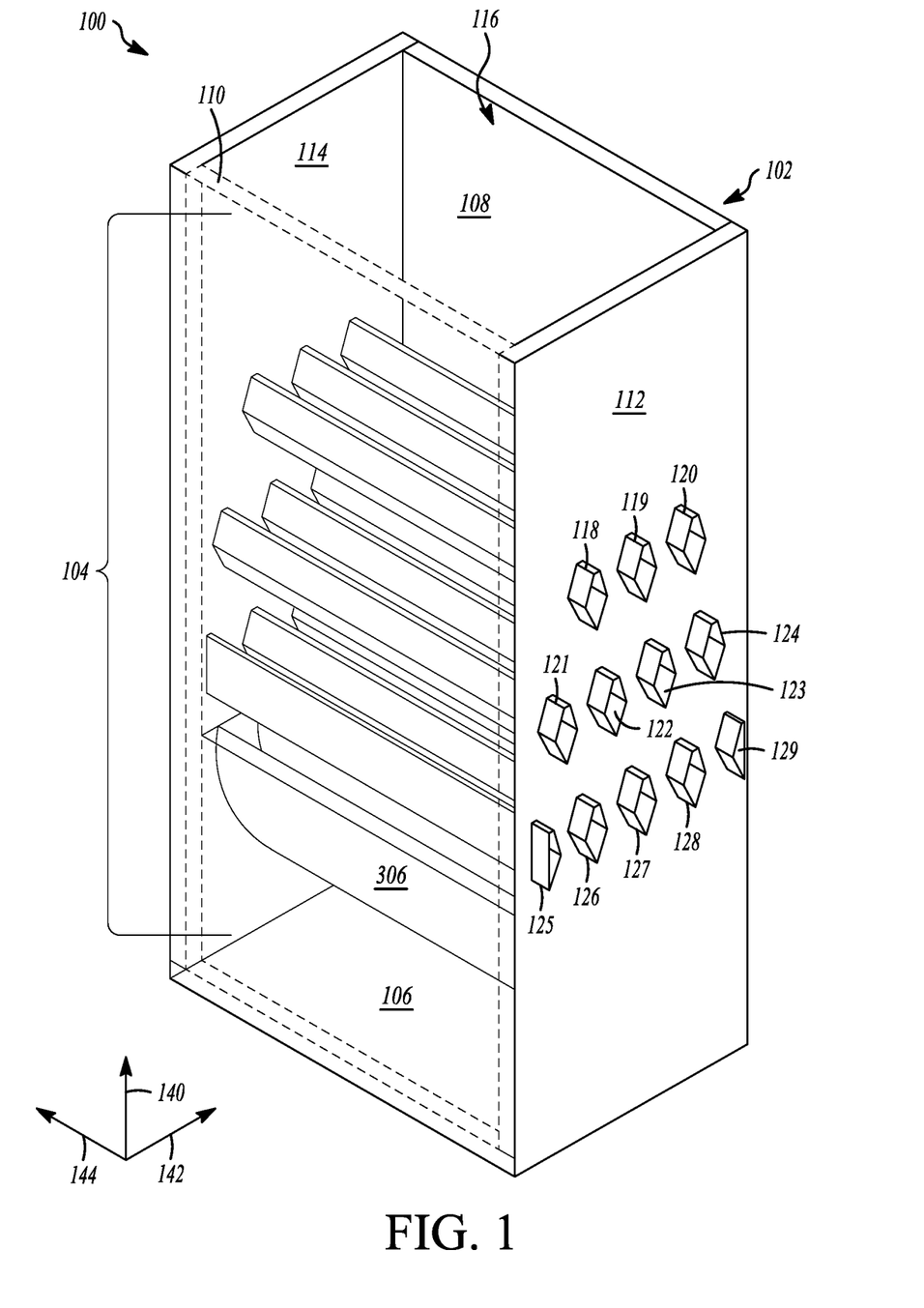
FIG. 1 is first partially cutaway perspective view of an exhaust baffle apparatus.
Figure 2:
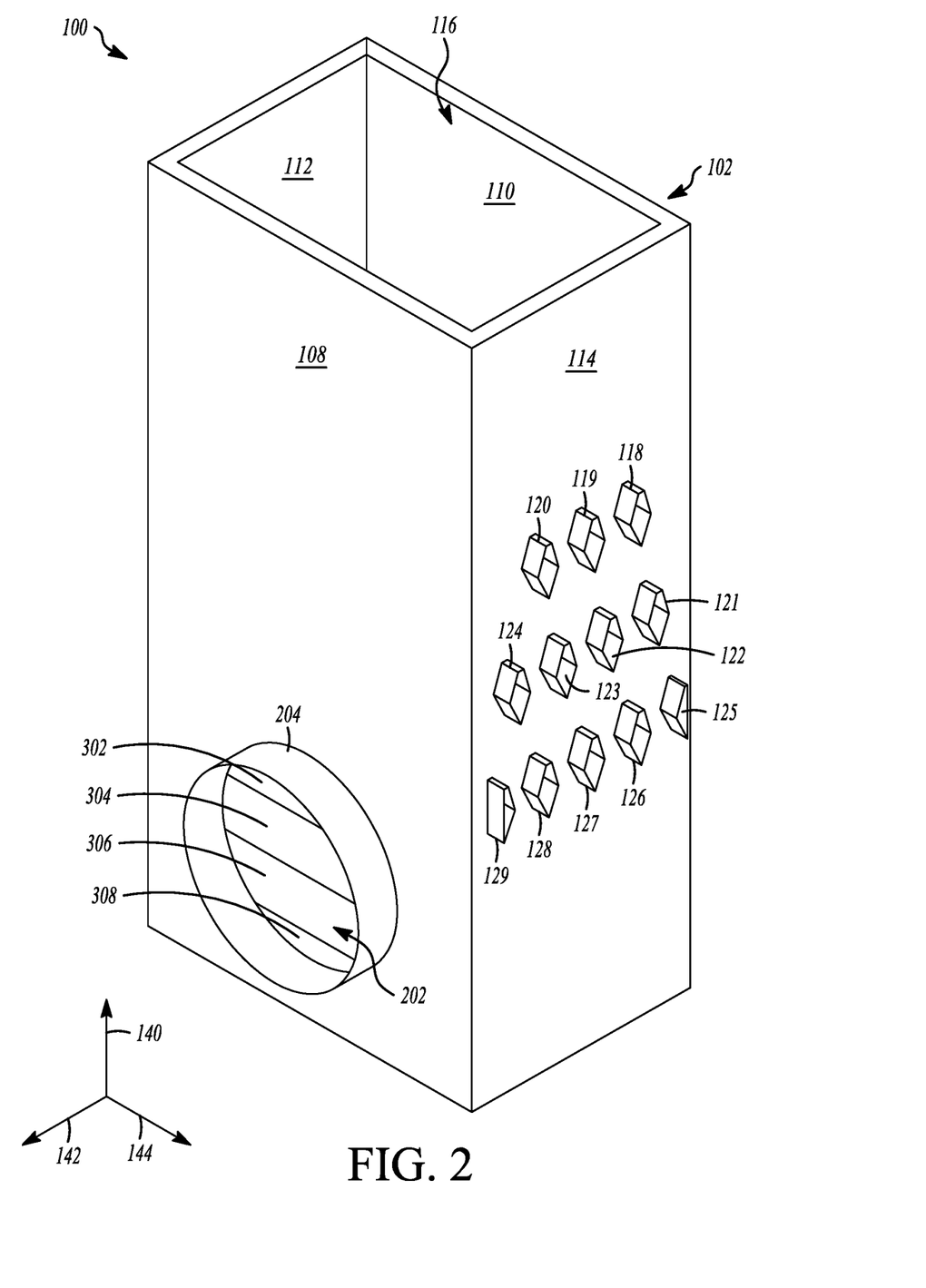
FIG. 2 is a second perspective view of the apparatus.
Figure 3:
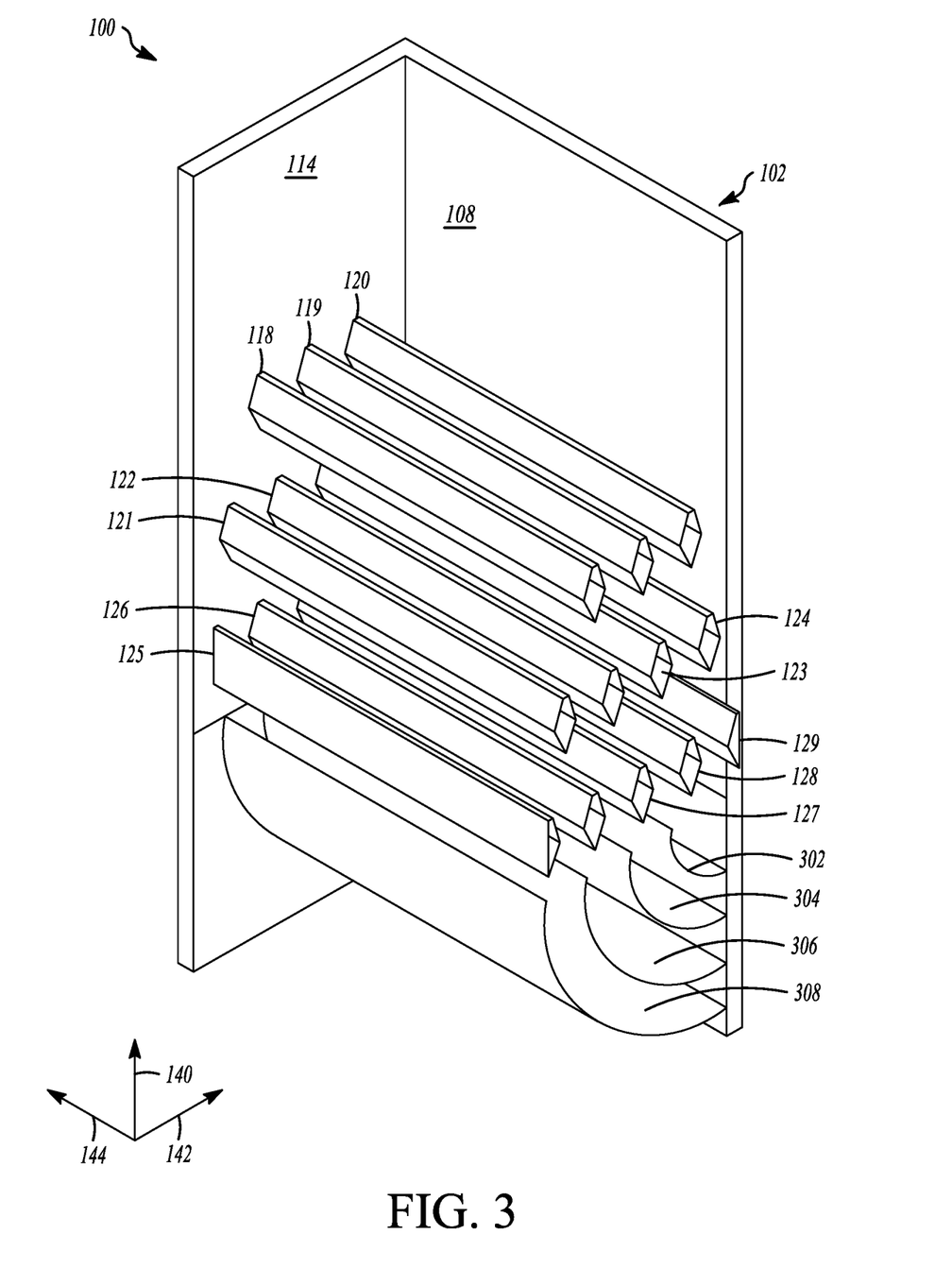
FIG. 3 is the first perspective view from FIG. 1, with additional components removed.
Figure 5:
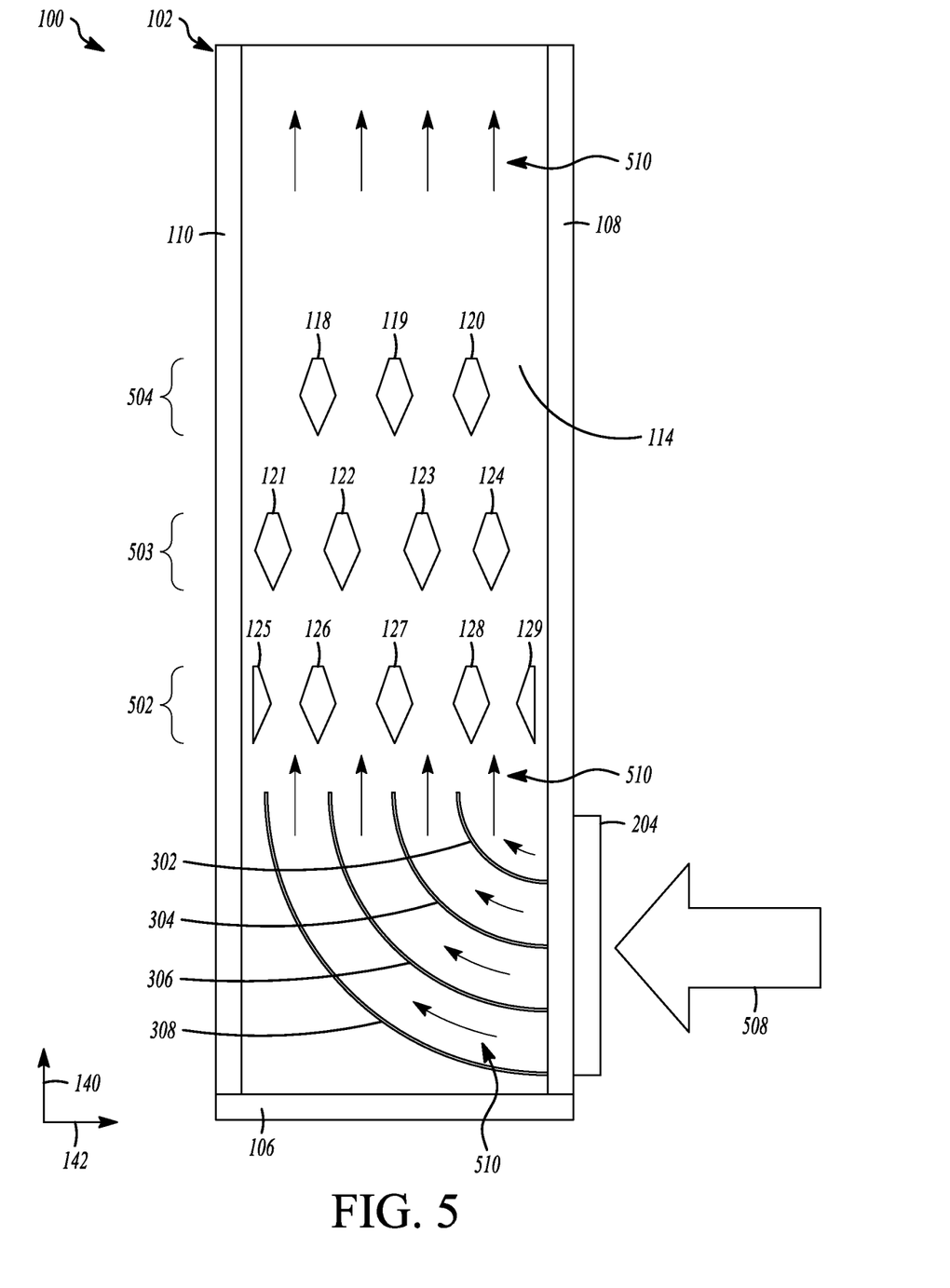
FIG. 5 is a cutaway side plan view of the apparatus.
Figure 6:
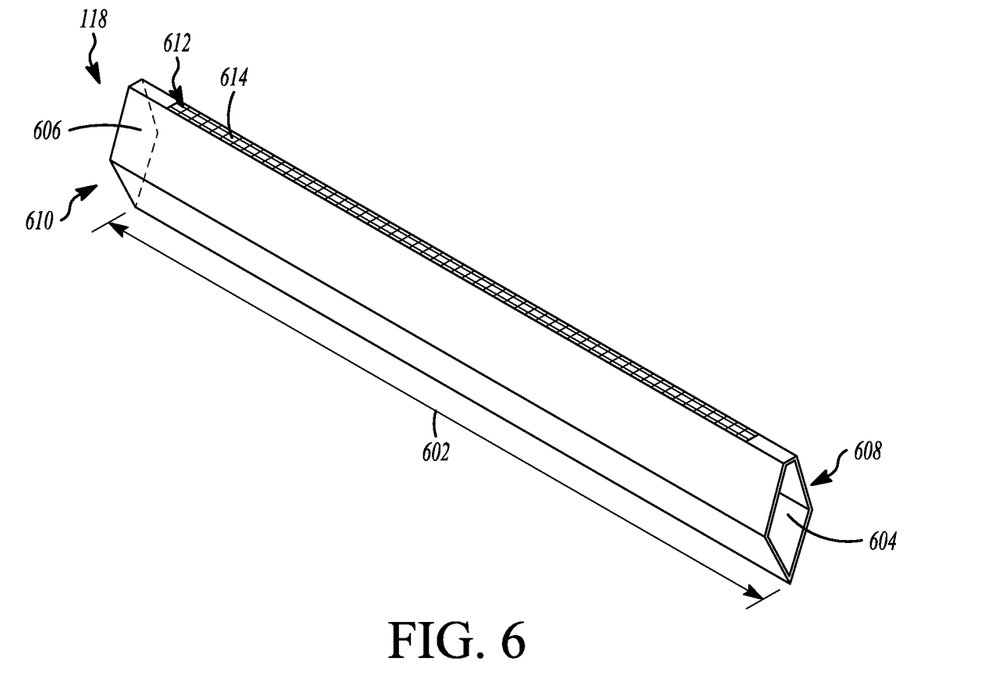
FIG. 6 is a perspective view of a first embodiment of mixer.
Figure 7:
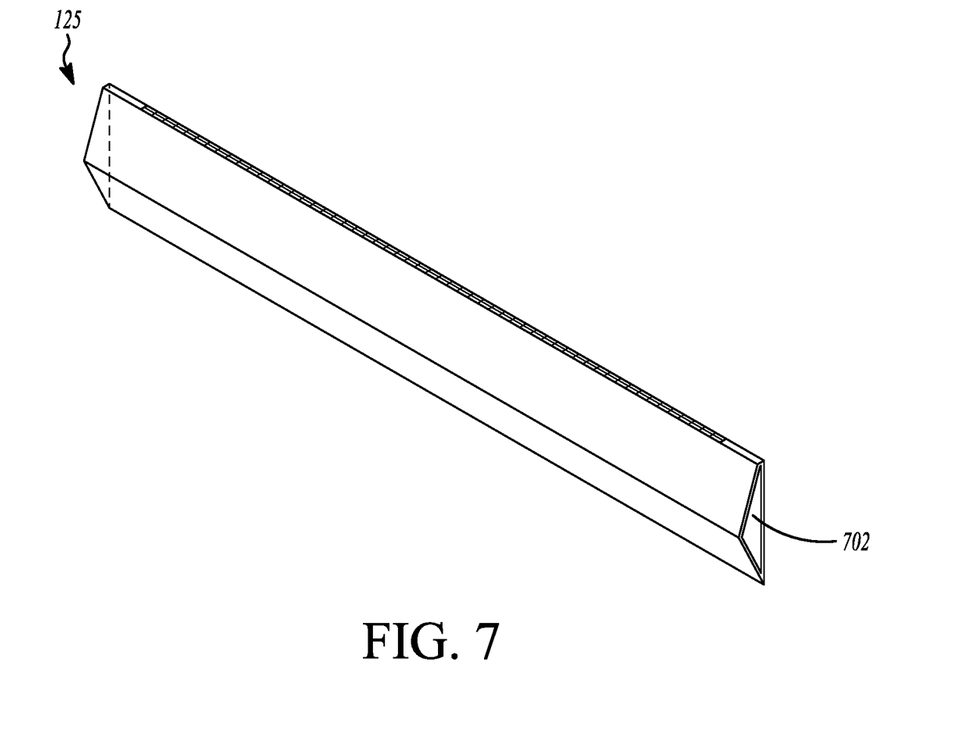
FIG. 7 is a perspective view of a second embodiment of mixer.
Figure 8:
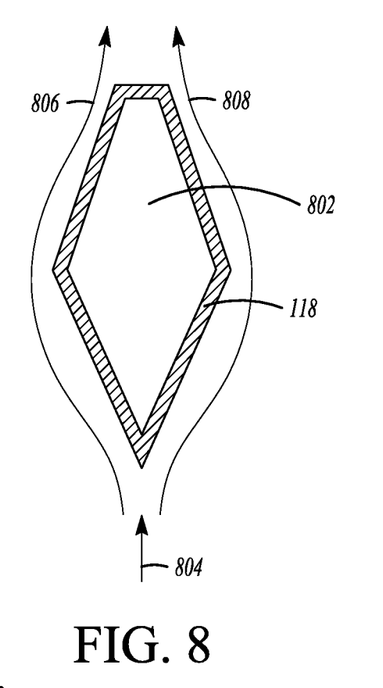
FIG. 8 is a side plan cross sectional view of an exemplary mixer.
Figure 9:
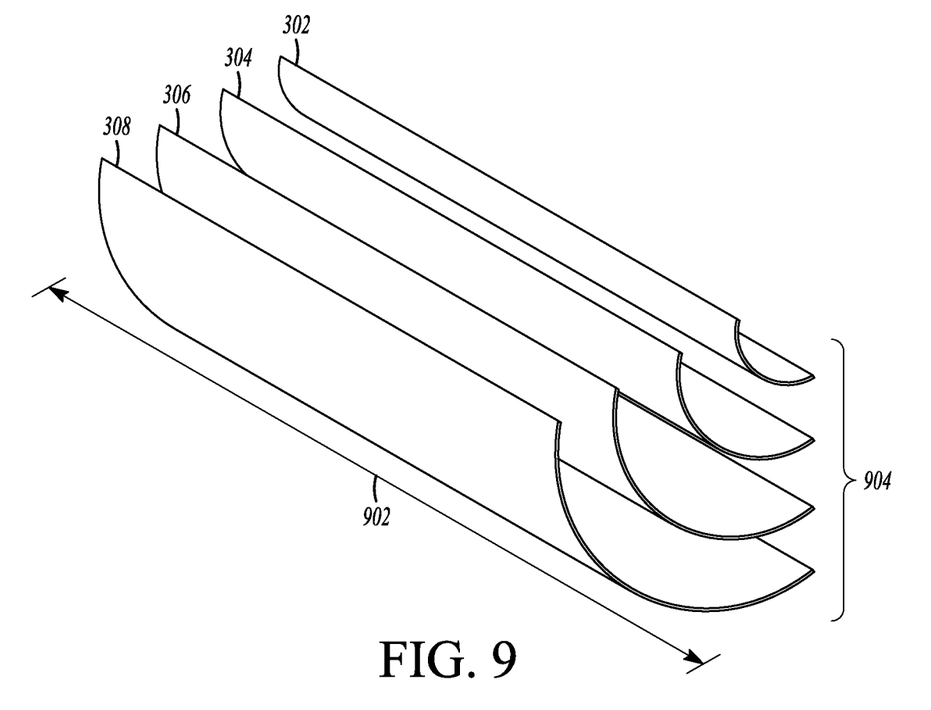
FIG. 9 is a perspective view of multiple diverters.
Figure 10:
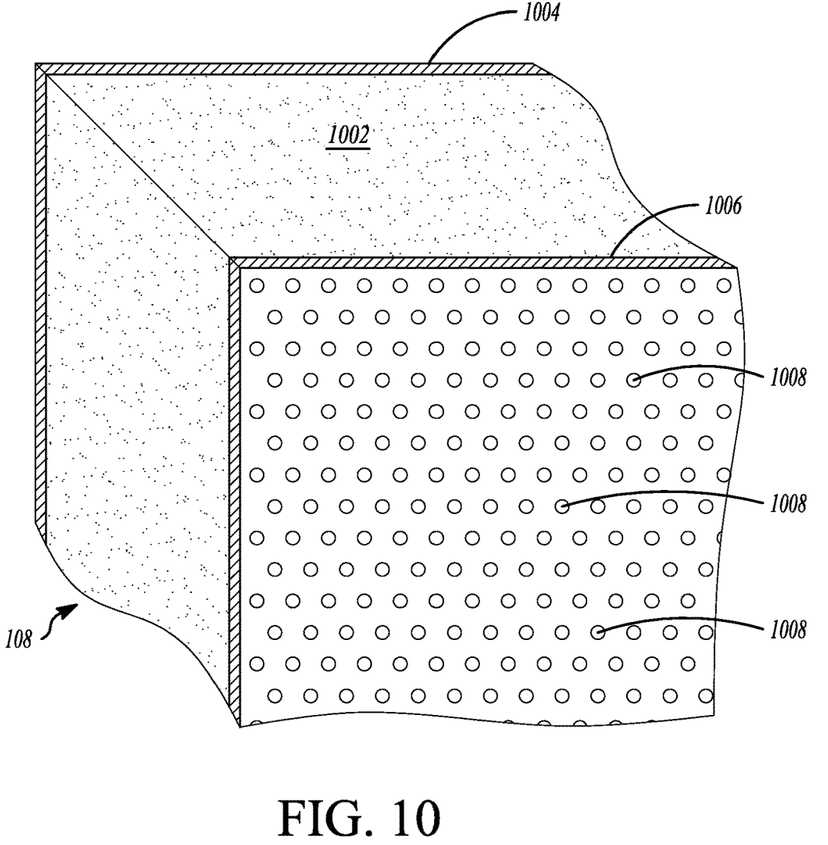
FIG. 10 is a partially cutaway perspective cross-sectional view of wall layering.
Figure 12:
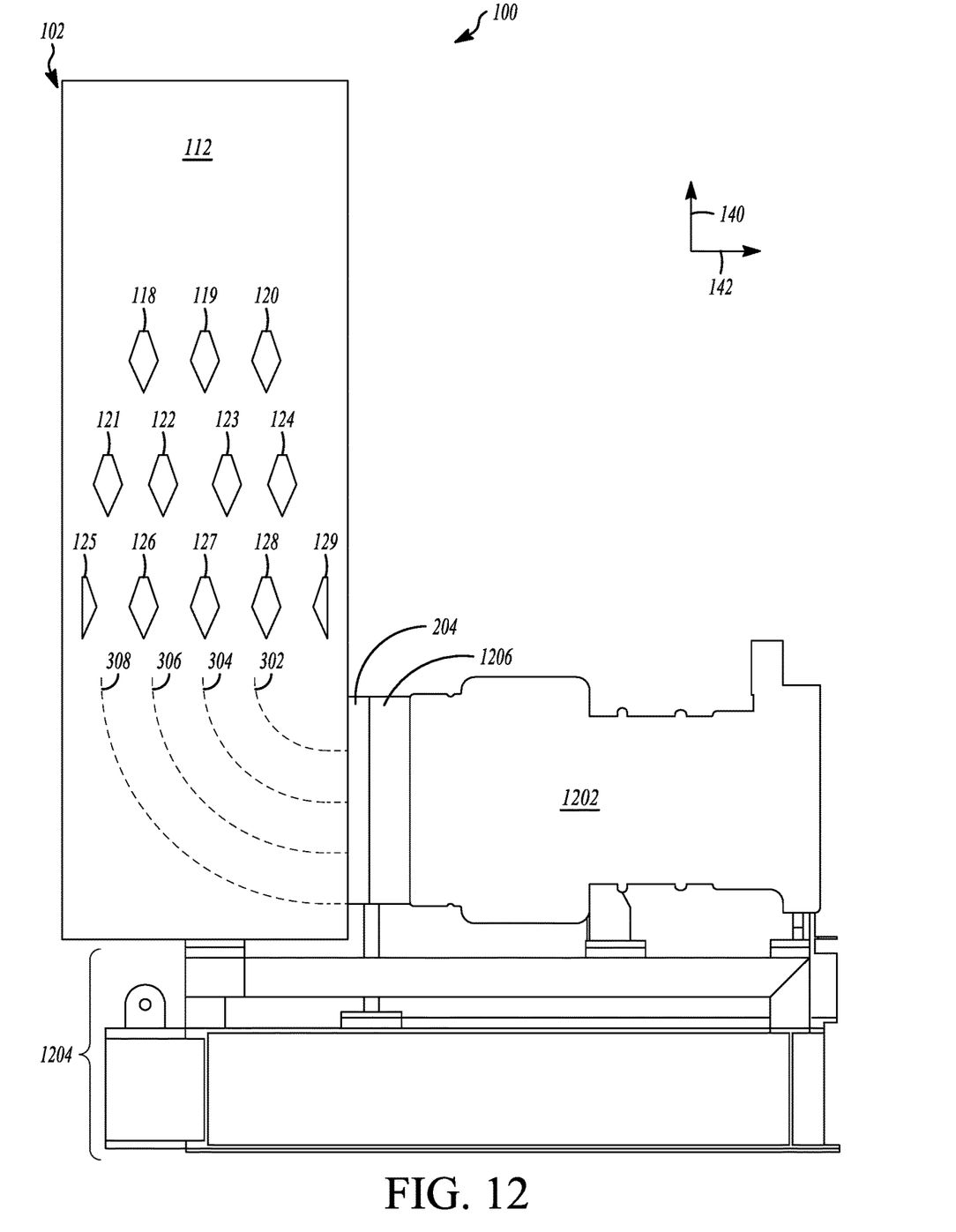
FIG. 12 is a side plan view of the apparatus attached to a gas turbine engine and installed on a platform.

| FIG. | Reference No. | Name |
|---|---|---|
| FIG. 1 | 100 | exhaust baffle apparatus |
|  | 102 | enclosure |
|  | 104 | internal volume |
|  | 106 | floor |
|  | 108 | first side wall |
|  | 110 | second side wall |
|  | 112 | first end wall |
|  | 114 | second end wall |
|  | 116 | exhaust opening |
|  | 118-129 | mixers |
|  | 140 | longitudinal direction |
|  | 142 | anterior direction |
|  | 144 | lateral direction |
| FIG. 2 | 202 | intake opening |
|  | 204 | shroud |
| FIG. 3 | 302-308 | diverters |
| FIG. 5 | 502-504 | mixer rows |
|  | 508 | source exhaust flow |
|  | 510 | airflow path |
| FIG. 6 | 602 | mixer length |
|  | 604/606 | mixer end openings |
|  | 608/610 | mixer ends |
|  | 612 | mixer vent |
|  | 614 | mixer screen |
| FIG. 7 | 702 | flat wall |
| FIG. 8 | 802 | hollow core |
|  | 804 | airflow |
|  | 806/808 | subpath |
| FIG. 9 | 902 | diverter lengths |
|  | 904 | diverter receiving ends |
| FIG. 10 | 1002 | insulating layer |
|  | 1004 | exterior layer |
|  | 1006 | interior layer |
|  | 1008 | perforations |
| FIG. 12 | 1202 | engine |
|  | 1204 | support structure |
|  | 1206 | engine shroud |

DETAILED DESCRIPTION

The nature, objectives, and advantages of the invention will become more apparent to those skilled in the art after considering the following detailed description in connection with the accompanying drawings.

Hardware Components and Interconnections

Overall Structure

The present disclosure illustrates various aspects of an exhaust baffle apparatus and method. For ease of reference, without any intended limitation, this system may be equivalently referred to as an exhaust baffle, engine exhaust baffle, exhaust baffle apparatus, and the like. This system provides an apparatus to reduce heat and noise produced by a mostly stationary engine such as a gas turbine engine at a hydrocarbon production well site or other industrial setting.

Referring to FIG. 1, there is shown an exemplary baffle apparatus 100, which includes an enclosure 102 defining an internal volume 104. The enclosure 102 has a floor 106 and walls including first side wall 108, second side wall 110, first end wall 112, and second end wall 114. In FIG. 1 the second side wall 110 is hidden with its outline depicted in dotted lines in order to reveal the various components located within the enclosure 102. The enclosure 102 has an intake opening 202 (best shown in FIG. 2) and an opposing exhaust opening 116. The intake opening 202 is at one end of the generally longitudinal enclosure 102 and the exhaust opening 116 is at the longitudinally opposite end.

When explaining the apparatus 100, it is helpful to establish certain dimensional orientations. In this regard, this is a longitudinal dimension 140, an anterior dimension 142, and a lateral dimension 144. Each of the dimensions 140/142/144 is bidirectional. Also, as best depicted in FIG. 5, the enclosure 102 defines an airflow path 510 proceeding from the intake opening 202 to the exhaust opening 116. This is explained in greater detail below.

As shown in FIG. 2, the enclosure 102 may include a shroud 204 to assist with making an airtight coupling to an exhaust manifold or other appropriate component of an engine such as a turboshaft gas turbine engine.

Mixers

Figure 4:
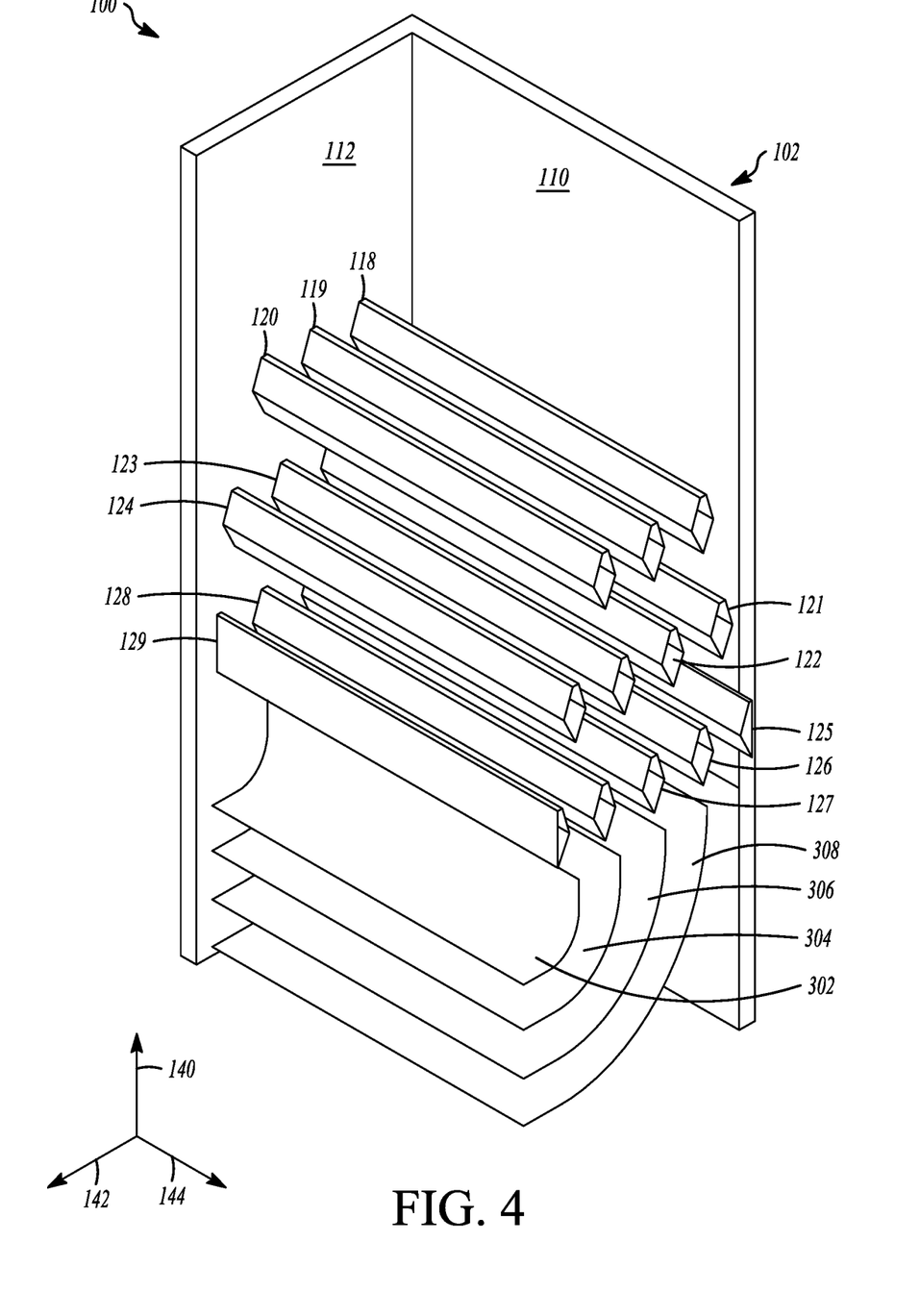
FIG. 4 is the second perspective view from FIG. 2, with additional components removed.

Referring to FIGS. 1-5, within the enclosure 102 there are multiple mixers, exemplified by 118-129. FIG. 3 shows the apparatus 100 of FIG. 1 with the second side wall 110, first end wall 112, and floor 106 removed to fully illustrate the contents of the enclosure 102. FIG. 4 shows the apparatus 100 with the first side wall 108, second end wall 114, and floor 106 removed. FIG. 5 shows the apparatus 100 with the first end wall 112 removed.

The mixers 118-129 are substantially parallel along their lengths in the lateral dimension 144, and they are further arranged such that their ends form multiple rows. FIG. 5 depicts this most plainly, with the rows 502-504. Successive rows 502, 503, and 504 have successively greater distances from the floor 106. The mixers of a given row are offset from the mixers of adjacent rows in the anterior dimension 142. As one example, but without any intended limitation, the mixers of a given row are evenly spaced from each other along the anterior dimension 142, and the various rows are evenly spaced from each other in the longitudinal dimension 140.

FIGS. 6 and 8 illustrate an illustrative mixer in greater detail, using mixer 118 as an example. The mixer 118 has a length 602 which, when the mixer is installed in the apparatus 100, spans the enclosure 102 in the lateral dimension 144 and lies transverse (i.e., perpendicular) to the longitudinal dimension 140 and airflow. The mixer 118 comprises a hollow airfoil, which includes a hollow core 802 as depicted in FIG. 8. This airfoil divides airflow 804 into multiple subpaths 806/808, and accordingly, may be implemented by any number of cross-sectional shapes such as diamond, circle, oval, teardrop, symmetrical wing, laminar flow wing, or other shape sufficient to achieve the objectives described herein.

A representative mixer 118 has longitudinally distant end openings 604/606 at respective ends 608/610, and also a lengthwise mixer vent 612 oriented toward the exhaust end of the airflow (i.e., upward as illustrated) when the mixer 118 is installed. The end openings 604/606 are partially or fully open as necessary according to implementation details such as the engine, required air flow, enclosure size, mixer size, ratio of component sizes, etc. The end openings 604/606 facilitate drawing ambient air from an area outside the mixer 118 into the mixer core 802, as explained in greater detail below.

In one example, the mixer vent 612 is covered by a protective screen 614 or grating or other protective device that permits airflow while preventing the passage of debris of a predetermined size or size range or shape. In a different implementation, rather than a single lengthwise slot, the mixer vent 612 comprises a multitude of slots or holes or vents or other apertures across some or all of the mixer's upper surface, and these apertures may be screened or unscreened. In the illustrated example, the mixer vent 612 and screen 614 occupy a central portion of the topmost surface of the mixer 118, and the distal portions of the topmost surface are solid to help retain the shape and rigidity of the mixer.

In the illustrated arrangement, the first row 502 of mixers includes two differently configured mixers 125/129. These "half mixer" designs accommodate a greater number of mixers per row, since the two end mixers can be half mixers. In this example, the "half mixers" have a cross-sectional shape that is cross-sectionally similar to an isosceles triangle as shown in FIG. 7. In the case of the mixer 125, flat base 702 facilitates installation of the mixer 125 with the base 702 proximate to or even abutting the side wall 110. This is merely one implementation example, however, and such half mixers may be distributed in different or additional or all locations or even omitted entirely. Furthermore, the reduced cross-sectional size may assume other shapes than the illustrated triangular cross section.

Diverters

As best shown in FIGS. 3 and 5, but also illustrated in FIGS. 1-2, 4, 9-10, the baffle apparatus 100 may additionally include multiple diverters 302-308, which serve to receive source exhaust flow 508 external to the enclosure 102 and divert it to an overall flow in the longitudinal dimension 140 of the enclosure 102. In the illustrated example, the diverters 302-308 divert source exhaust flow 508 from a generally horizontal direction to an overall vertical direction within the enclosure 102. However, the vertical/horizontal relative orientations may change based on the relative installations of the enclosure 102 and the engine. For example, the enclosure 102 may lie on its side, with the engine exhaust aimed upward or downward into the enclosure 102. Furthermore, in one implementation, the engine exhaust may enter the enclosure 102 from the direction of the floor 106, in which case the diverters 302-308 may be omitted entirely.

As illustrated, the diverters comprise arc-shaped panels within the enclosure 102 near the intake opening 202, which are arranged to receive air entering the intake opening 202 in the anterior dimension 142, and to redirect the received air into the airflow path 510 and ultimately a flow resembling the longitudinal dimension 140.

The diverters 302-308 have lengths 902 that span the enclosure 102 in the lateral dimension 144. The lengths of these diverters 302-308 are substantially parallel as installed. The diverters 302-308 have receiving ends 904 (FIG. 9) residing at the intake opening 202 to receive source exhaust flow 508 entering the enclosure 102. The diverters 302-308 are shaped and placed to redirect the received air to an overall direction that ultimately lies parallel to the longitudinal dimension 140.

Wall Construction

Figure 11:
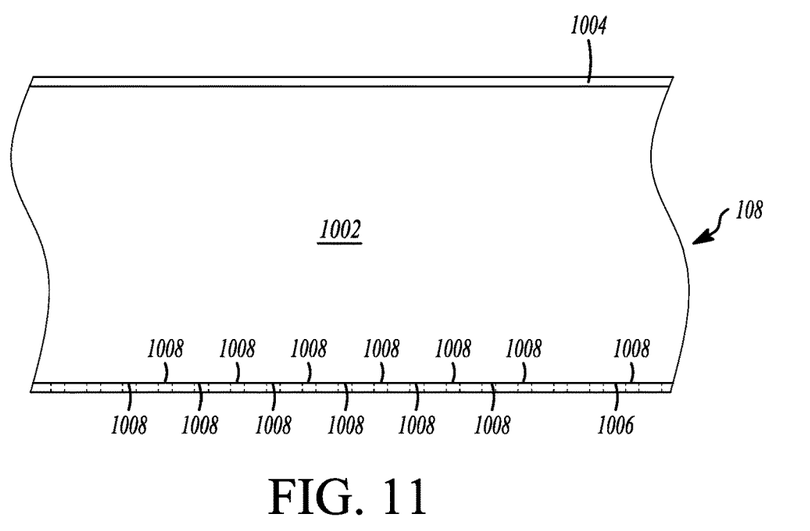
FIG. 11 is a top plan view of wall layering.

As best shown in FIGS. 10 and 11, various walls of the apparatus 100 may optionally be equipped with noise and/or sound reducing features. Broadly, in this example, certain walls of the structure 100 include an insulating material that is sandwiched between two adjacent rigid layers. The first side wall 108 is depicted as one example of this multi-layer construction. Here, the wall 108 includes an exterior layer 1004, an insulating layer 1002, and an interior layer 1006. The exterior layer 1004 faces the outside of the apparatus 100, whereas the interior layer 1006 faces the interior space of the enclosure 102. In one example, each of the layers 1004/1006 is made from 16 gauge stainless steel. In the same example, the interior layer 1006 comprises a noise and/or heat insulating material with some desirable qualities including being flame resistant, heat tolerant, and hydrophobic. Some examples include ceramic wool, stone wool, mineral wool, fiberglass, foam, acoustic panels or boards or fabrics, mass loaded vinyl, acoustic board, acoustic or sound absorbing foam, cotton or polyester batting, glue, resilient channels, drywall, piezoelectric membrane, or other passive or active material. An example of one specific product is Morgan Thermal Ceramics brand Superwool product, which is a ceramic wool material. In the present example, the layer 1002 occupies a thickness of two inches. The thickness may increased or decreased, or additional layers added, depending on the level of anticipated noise and heat. The insulating layer 1002 absorbs heat and noise and furthermore prevents the transfer of heat and noise to the exterior layer 104 as would occur if an air gap were to be used instead of the insulating layer 1002.

Although the exterior layer 1004 is solid, the interior layer 1006 is perforated to allow the sound and heat from the enclosure 102 to be absorbed by the insulating layer 1002. In one example, the layer 1006 includes perforations 1008 that are evenly spaced in rows, with adjacent rows staggered from each other. In other words, the perforations of one row are staggered horizontally with respect to the perforations in the previous and subsequent rows. In a specific example, the perforations 1008 are laid out on 3/16 inch centers, and each perforation has a diameter of 3/32 inch.

In the illustrated example, the aforementioned layered wall construction is applied to the walls 108, 110, 112, and 114. This construction is avoided for the floor 106, to avoid the scenario where water pools in the bottom of the enclosure 102 and seeps into the floor 106.

Installation

FIG. 12 illustrates one exemplary installation of the apparatus 100. Here, the apparatus 100 is connected to a gas turbine engine 1202 and both of these are mounted on a support structure 1204. Of course, separate support structures may be used instead. The engine 1202 as illustrated includes an exhaust manifold or engine shroud 1206 that is coupled to the enclosure shroud 204. The shrouds 1206/204 efficiently route engine exhaust from the engine 1202 into the enclosure 102 and may, but need not, form an airtight seal.

In the installation of FIG. 12, the axis of rotation of the engine 1202 is horizontal and the long dimension 140 of the enclosure 102 is oriented vertically. Other arrangements may be used, but this one offers certain advantages. First, this arrangement permits airflow from the enclosure 102 to flow and exit upward, directing noise and heat and exhaust fumes away from personnel on the ground. Second, this is consistent with the normal orientation of installation of many gas turbine engines such as the Lycoming model T-53, which are often operated horizontally.

Other arrangements are nevertheless possible, as will be apparent to ordinarily skilled artisans having the benefit of this disclosure. For example, the engine 1202 may be mounted in line with the enclosure 102. In this case, the intake opening 202 is relocated to the floor 1206, and the engine shroud 1206 attached to the relocated intake opening 202. In this example, the engine 1202 may be installed so that its axis of rotation is vertical, or in the alternative, exhaust pipes or other plumbing may be used to re-route engine exhaust. In any case, the diverters 302-308 may be omitted in the embodiment where engine exhaust enters from the floor 106, whereupon exhaust flow continues without substantial diversion into the longitudinal dimension 140 of the enclosure 102.

Airflow Path

Figure 13:
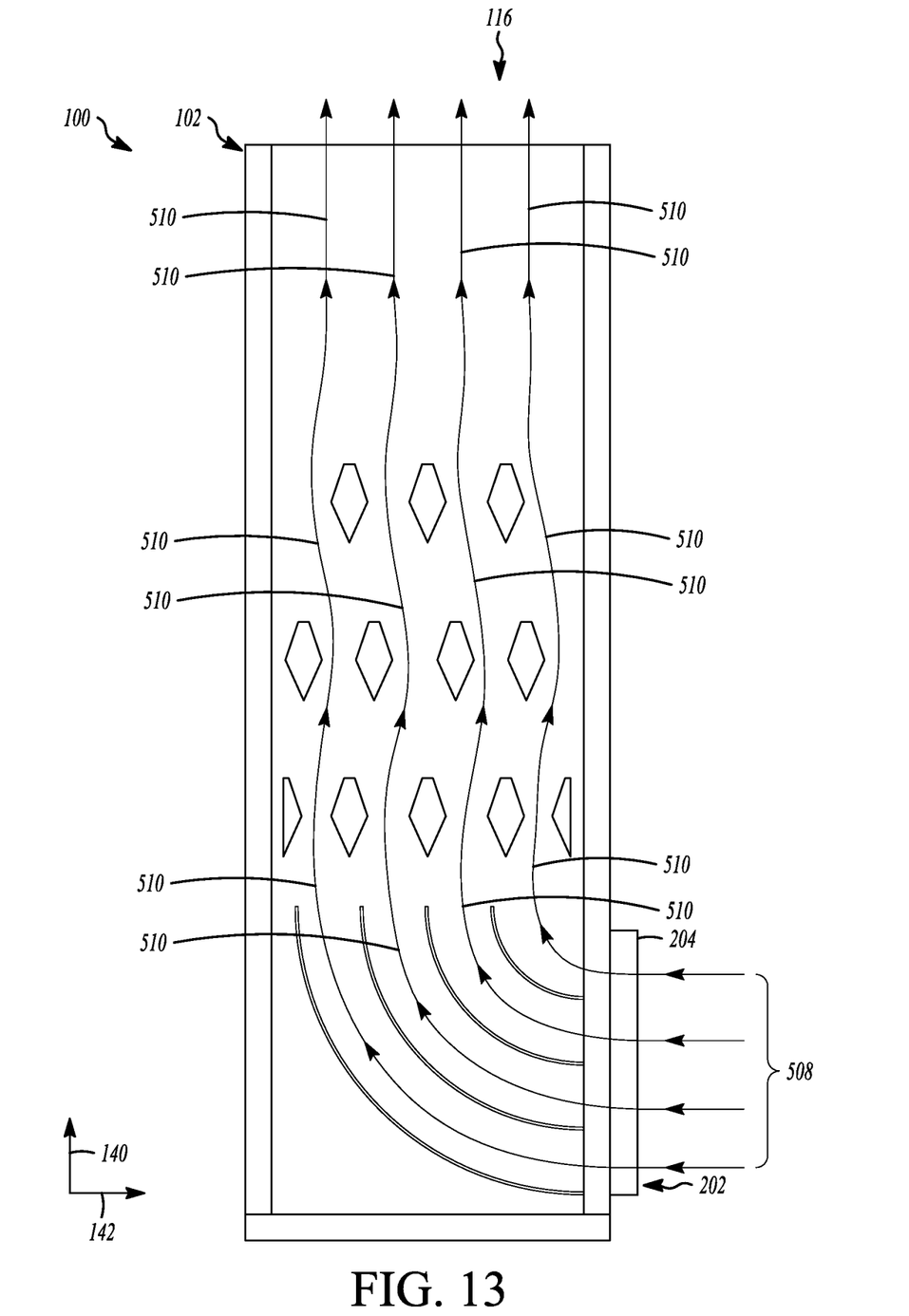
FIG. 13 is a partially cutaway side plan view of the apparatus illustrating an exemplary airflow path.

FIG. 13 depicts the airflow path 510 during operation of the apparatus 100. Source exhaust flow 508 from the engine 1202 enters the shroud 204 and intake opening 204. The exhaust subsequently follows the airflow path shown by 510. Namely, exhaust enters the enclosure 102 and the diverters 302-308 divert the flow from an anterior dimension 142 into a longitudinally upward direction 140. Flow continues upward, around the mixers 118-129, and then exits the enclosure 102 at the exhaust opening 116.

More Details

The components described above may be fabricated from a variety of materials. One example uses a combination of sheet metal, square tube metal, and round tube metal. The components may be fastened with any or all of screws, rivets, bolts, welding, press fits, and the like. Some exemplary metals include steel, stainless steel, aluminum, titanium, and tungsten.

Operation

Figure 14:
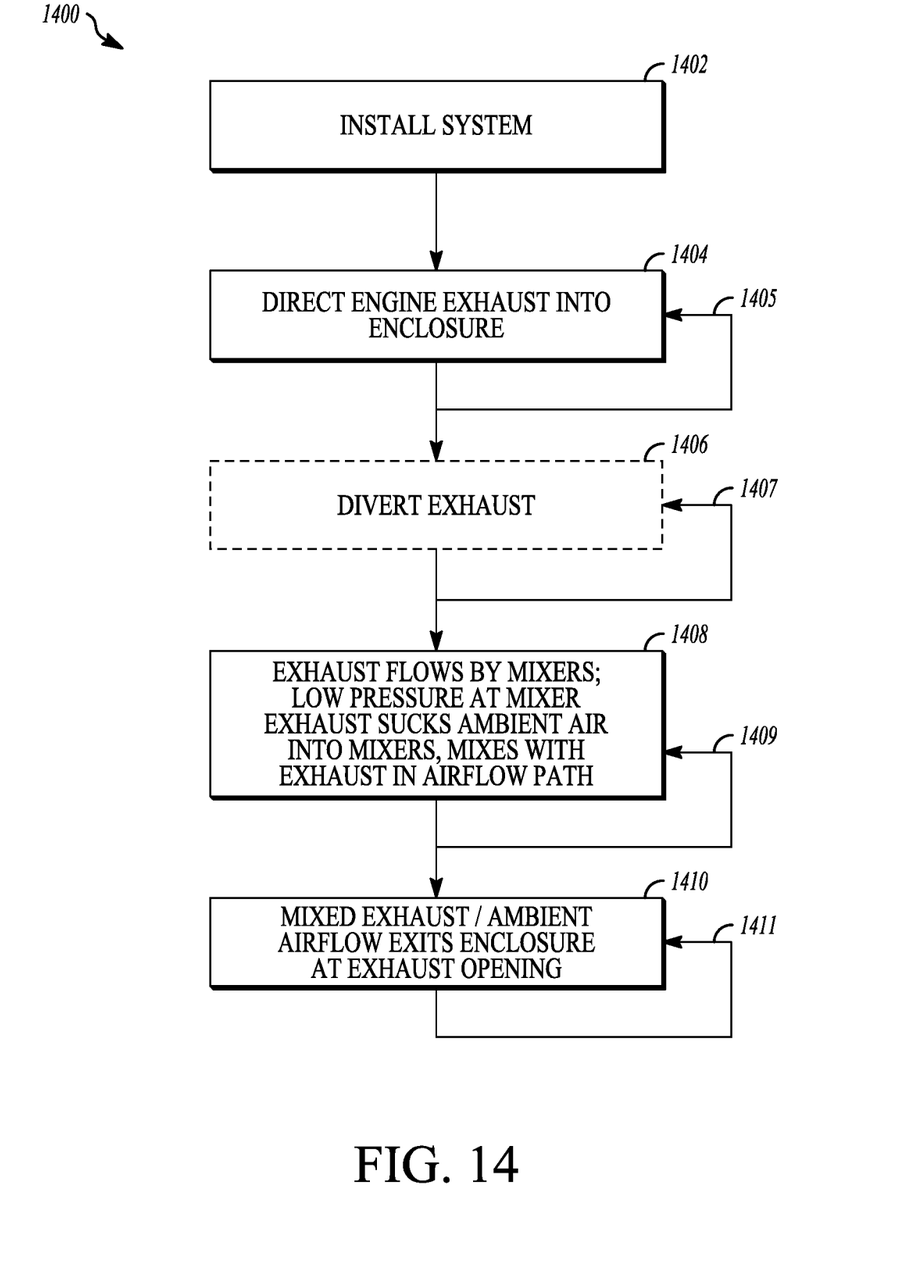
FIG. 14 is a flowchart illustrating operations for reducing engine exhaust noise and heat.

Having described the structural features of the present disclosure, the operational aspects of the disclosure will now be described. Without any intended limitation, the operational aspects are illustrated in the context of the structure from FIGS. 1-13. One operational aspect of the disclosure is a method of dampening noise and heat from the exhaust of an engine such as a turboshaft gas turbine engine in an industrial setting. FIG. 14 illustrates the operations 1400 of this exemplary method.

In step 1402, technicians install the apparatus 100. In the illustrated arrangement, this involves mounting the enclosure 102 and engine 1202 upon the support structure 1204 and interconnecting them as depicted by FIG. 12.

Step 1404 directs source exhaust flow 508 from the engine 1202 into the intake opening 202. Step 1404 is caused by the operation of the engine 1202 and configuration of the shrouds 1206/204 cooperating to force exhaust form the engine 1202 into the enclosure 102. As depicted by 1405, step 1404 occurs continually as long as the engine 1202 is producing exhaust.

In step 1406, the diverters 302-308 receive the source exhaust flow 508 and redirect it. The diverters 302-308 receive source exhaust 508 moving in the anterior dimension 142 and redirect it into the longitudinal dimension 140 (i.e., upward as illustrated). Step 1406 is optional and it may be omitted in cases where the engine exhaust is aligned with the longitudinal dimension 140, or the exhaust is plumbed to achieve such alignment externally to the enclosure 102. For example, the intake opening 202 may be relocated to the floor 1206, and the engine shroud 1206 attached to the relocated intake opening 202. In embodiments where step 1406 is not omitted, this step repeats 1407 continuously as long as the engine 1202 produces exhaust.

In step 1408, engine exhaust proceeds from the diverters 302-308 upwardly and continues past the mixers 118-129. The mixers receive airflow 804 from below and the airfoil shape of each mixer divides the airflow 804 into multiple subpaths 806/808. The passage of exhaust around each mixer in subpaths 806/808 creates a low pressure occurring at the mixer vent 612. This low pressure withdraws ambient air through the mixer ends 608/610 of each mixer and discharges the ambient air upwardly into the air flow path 510. The air discharged from the mixer vents then joins the airflow path 510 and mixes with the engine exhaust arriving from below. This mixing operation contributes to reducing noise and heat in the exhaust path 510. As depicted by 1409, step 1409 occurs continually as long as the engine 1202 produces exhaust.

In step 1410, mixed exhaust/ambient airflow exits the enclosure 102 at the exhaust opening 116. As depicted by 1411, step 1410 occurs continually as long as the engine 1202 produces exhaust. Throughout steps 1404, 1406, 1408, and 1410, the layered wall construction explained in FIGS. 10-11 contributes to the apparatus's effect in reducing engine noise.

Benefits & Advantages

The disclosed exhaust baffle apparatus and method provide a number of advantages. Prior to the present invention, the immense exhaust produced by a gas turbine engine was a significant disadvantage, in that it constituted the source of significant noise and heat. To address the heat and noise problem, the present inventors harnessed the immense exhaust flow to forcefully drive forced ambient/exhaust mixing that significantly reduces exhaust noise and exhaust heat.

Crew should still use hearing protection, but the disclosed approach significantly reduces workplace noise due to the mixing of ambient air with engine exhaust. This same mixing has the additional effect of reducing heat, making the workplace more comfortable and safer. Advantageously, this approach does not require intricate engine modifications or external power, and avoids complicated engineering, technical, and manufacturing work. It also grants the ultimate customer great flexibility in choosing from a huge variety of available engines.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The invention claimed is:

1. An exhaust baffles apparatus, comprising:
an enclosure having longitudinal, lateral, and anterior dimensions, the enclosure defining an internal volume defining an exhaust flow an airflow path proceeding from an intake opening to an exhaust opening; and
a multiplicity of mixers within the enclosure, each mixer including a length spanning the lateral dimension of the enclosure transverse to the flow path, each mixer comprising a hollow duct substantially open at lateral ends of the mixer, each mixer having defined therein at least one vent oriented toward the exhaust opening; and
wherein, at said lateral ends of the mixers, each said mixer is substantially open to an exterior of the enclosure.

2. The apparatus of claim 1, where the lengths of the mixers are substantially parallel to each other, and the mixers are further arranged such that the lateral ends of the mixers lie in multiple rows where successive rows have successively greater distances from the intake opening, and where the mixers of each row are offset from the mixers of adjacent rows in the anterior dimension.

3. The apparatus of claim 1, further comprising:
multiple arc-shaped diverters within the enclosure proximate the intake opening and arranged to receive engine exhaust entering the intake opening in a direction substantially aligned with the anterior dimension and redirect the received engine exhaust to an overall direction substantially parallel to the longitudinal dimension.

4. The apparatus of claim 1, further comprising:
multiple arc-shaped diverters each having a length spanning the enclosure in the lateral dimension, the diverters being substantially parallel in said lengths, the diverters having receiving ends residing proximate the intake opening to receive engine exhaust entering the intake opening in a direction substantially aligned with the anterior dimension, the diverters shaped and positioned to redirect the received engine exhaust to an overall direction substantially parallel to the longitudinal dimension.

5. The apparatus of claim 1, one or more of the mixers having a substantially diamond-shaped cross-sectional shape.

6. The apparatus of claim 1, one or more of the mixers having a cross-sectional shape substantially similar to a triangle.

7. The apparatus of claim 1, the enclosure comprising multiple walls, where the mixers include at least one mixer with a cross-sectional shape substantially similar to an isosceles triangle with a base of the isosceles triangle substantially abutting one of the walls along a length of said mixer.

8. The apparatus of claim 1, where the at least one vent is covered by a screen.

9. The apparatus of claim 1, further comprising a gas turbine engine with its exhaust mechanically routed to the intake opening.

10. The apparatus of claim 1, the enclosure comprising multiple walls, where one or more of the walls includes an exterior layer and an interior layer with an insulating layer therebetween, where the interior layer defines a multiplicity of perforations admitting passage of gaseous matter through the interior layer to the insulating layer.

11. A method of dampening noise and heat from engine exhaust, comprising operations of:
directing engine exhaust into an intake opening of an enclosure defining an internal volume having opposing openings including the intake opening and an exhaust opening, and thereafter directing the engine exhaust along an exhaust path proceeding from the intake opening to the exhaust opening; and
passing the directed exhaust across a multiplicity of mixers within the enclosure, each of the mixers including a length spanning the enclosure transverse to the exhaust path, each mixer comprising a hollow duct substantially open at lateral ends of the mixer and at least one vent oriented toward the exhaust opening; and
wherein, at said lateral ends of the mixers, each said mixer is substantially open to an exterior of the enclosure.

12. The method of claim 11, the operations further comprising:
the mixers reducing noise and heat in the exhaust path by drawing ambient air from outside of the enclosure into the enclosure and mixing the drawn ambient air with the engine exhaust.

13. The method of claim 11, the operations further comprising:
as the directed exhaust proceeds across the mixers, the directed exhaust creating low pressure at the mixer vents and the low pressure drawing ambient air through the lateral ends of the ducts and the drawn ambient air mixing with the engine exhaust in the enclosure.

14. The method of claim 11, the operations further comprising:
as the directed exhaust proceeds across the mixers, the directed exhaust creating an area of low pressure at the mixer vents and the area of low pressure causing the following acts: withdrawing ambient air through the mixer ends, discharging the ambient air through the mixer vent, mixing the discharged ambient air with engine exhaust flowing around the mixers.

15. The method of claim 11, the operations further comprising:
at multiple arc-shaped diverters within the enclosure at the intake opening, receiving engine exhaust entering the intake opening transverse to the exhaust flow path and redirecting the received engine exhaust substantially to the exhaust flow path.

16. The method of claim 11, the operations further comprising:
receiving engine exhaust entering the intake opening transverse to the exhaust flow path and redirecting the received engine exhaust toward the mixers.

17. The method of claim 11, the operations further comprising attaching an exhaust manifold of a gas turbine engine to the intake opening of the enclosure.

18. The method of claim 11, the operations further comprising arranging the mixers such that lengths of the mixers are substantially parallel to each other and the lateral ends of the mixers lie in multiple rows where successive rows have successively greater distances from the intake opening, and where the mixers of each row are offset from the mixers of adjacent rows in the anterior dimension.

19. The method of claim 11, the operations further comprising providing walls to form the enclosure, the walls where one or more of the walls includes an exterior layer and an interior layer with an insulating layer therebetween, where the interior layer defines a multiplicity of perforations admitting passage of gaseous matter through the interior layer to the insulating layer.

20. The method of claim 11, the operations further comprising providing perforations in walls that form the enclosure, said perforations admitting sound from within the enclosure into insulating material internal to the walls.

21. The apparatus of claim 1, where each of the mixers is substantially open only at said lateral ends and said vent.

22. The apparatus of claim 1, where the lateral ends of each mixer protrude through the enclosure.

23. The exhaust baffle apparatus of claim 1, where the enclosure forms a single contiguous chamber.

24. An exhaust baffle apparatus, comprising:
an enclosure having longitudinal, lateral, and anterior dimensions, the enclosure defining an exhaust flow path proceeding from an intake opening substantially near one longitudinal end of the chamber to an exhaust opening substantially near an opposing longitudinal end of the chamber; and
a multiplicity of mixers within the enclosure, each mixer comprising a hollow duct spanning the enclosure transverse to the exhaust flow path, each said duct having distal ends substantially open to exterior of the enclosure, each said duct further including a vented region residing within the enclosure and being oriented substantially in a downstream direction of the exhaust flow path.

25. The exhaust baffle apparatus of claim 24, where each mixer comprises an airfoil.

26. An exhaust baffle device, comprising:
an enclosure having an inlet located substantially at one end of the enclosure and an outlet located substantially at an opposite end of the enclosure, the inlet and outlet defining therebetween an exhaust flow path having an exhaust flow direction;
lying inside the enclosure perpendicular to the exhaust flow path, multiple substantially hollow ducts spanning the enclosure from side to side;
where each duct includes longitudinal venting oriented toward a downstream direction of the exhaust flow path; and
where each duct includes substantially open distal ends in fluid communication with an exterior of the enclosure.

27. A method for reducing exhaust noise from a gas turbine engine, comprising:
providing an enclosure having an inlet positioned substantially at one end of the enclosure and an outlet positioned substantially at an opposite end of the enclosure;
providing multiple substantially parallel and substantially hollow elongated mixers lying inside the enclosure and spanning the enclosure from side to side, each of the mixers being substantially open at lateral ends thereof to an exterior of the enclosure, each of the mixers further being vented in a longitudinal region oriented toward a predefined downstream direction of a predefined exhaust gas flow path;
introducing a flow of exhaust gasses into the enclosure, the exhaust gasses traversing a route between the inlet and the outlet, said route forming the predefined exhaust gas flow path; and
the exhaust gasses passing around and past the mixers while en route from the inlet to the outlet along the exhaust gas flow path.

* * * * *

UNITED STATES PATENT AND TRADEMARK OFFICE
CERTIFICATE OF CORRECTION

PATENT NO. : 10,815,833 B1
APPLICATION NO. : 16/418200
DATED : October 27, 2020
INVENTOR(S) : McIntyre, II et al.

Page 1 of 1

It is certified that error appears in the above-identified patent and that said Letters Patent is hereby corrected as shown below:

On the Title Page

Item (51), under "Int. Cl.", Lines 1-3,
    *F01D 25/30*    (2006.01)
    *F01D 25/12*    (2006.01)
delete "*F02C 7/24*    (2006.01)" and insert -- *F01D 25/30*    (2006.01) --, therefor.

In the Specification

In Column 1, Line 56, delete "Typically" and insert -- Typically, --, therefor.

In Column 2, Line 56, delete "cross sectional" and insert -- cross-sectional --, therefor.

In the Claims

In Column 9, Claim 1, Line 8, delete "baffles" and insert -- baffle --, therefor.

In Column 9, Claim 1, Line 12, delete "opening; and" and insert -- opening; --, therefor.

In Column 10, Claim 11, Line 11, delete "opening; and" and insert -- opening; --, therefor.

In Column 11, Claim 23, Line 12, delete "exhaust baffle apparatus" and insert -- apparatus --, therefor.

In Column 12, Claim 26, Line 1, delete "outlet" and insert -- the outlet --, therefor.

Signed and Sealed this
Twenty-ninth Day of December, 2020

Andrei Iancu
*Director of the United States Patent and Trademark Office*